United States Patent [19]

Wright

[11] Patent Number: 4,508,794

[45] Date of Patent: Apr. 2, 1985

[54] SECURITY BATTERY HOLDER

[76] Inventor: Anthony A. Wright, 1269 Clarendon, El Cajon, Calif. 92021

[21] Appl. No.: 573,836

[22] Filed: Jan. 25, 1984

[51] Int. Cl.³ .............................................. H01M 2/10
[52] U.S. Cl. ...................................... 429/100; 429/96
[58] Field of Search ............................ 429/100, 96-99, 429/1, 9

[56] References Cited

U.S. PATENT DOCUMENTS 4,297,635 10/1981 Stevens ........................... 429/100 X
4,429,025 1/1984 Stow ................................ 429/100 X Primary Examiner—Charles F. LeFevour
Attorney, Agent, or Firm—Baker, Maxham, Callan & Jester

[57] ABSTRACT

A battery holder for securing a battery in an automobile or the like includes a generally flat rectangular pan having upwardly extending side edges defining a laterally confining channel with a fixed end wall member, a releasable strap connected to the fixed end wall at one end of said pan for extending over a battery with a releasable locking end wall at the other end for securely locking the battery in position in the holder. The strap is hardened by heat treatment to resist the action of bolt cutters and is adjustable in length as well as the releasable connection position to accommodate different size batteries.

11 Claims, 5 Drawing Figures

U.S. Patent  Apr. 2, 1985  4,508,794
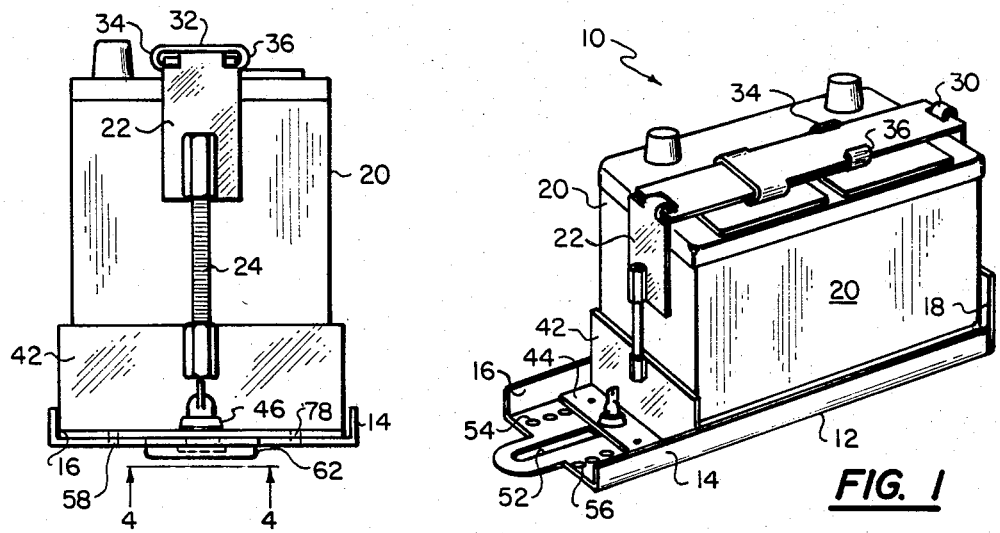
FIG. 3
FIG. 1
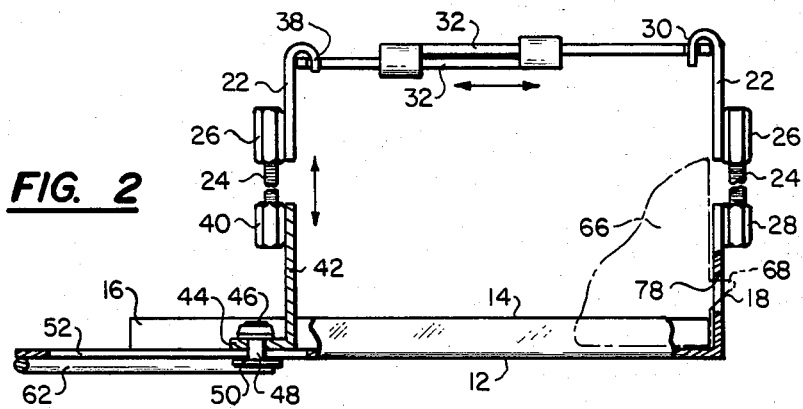
FIG. 2
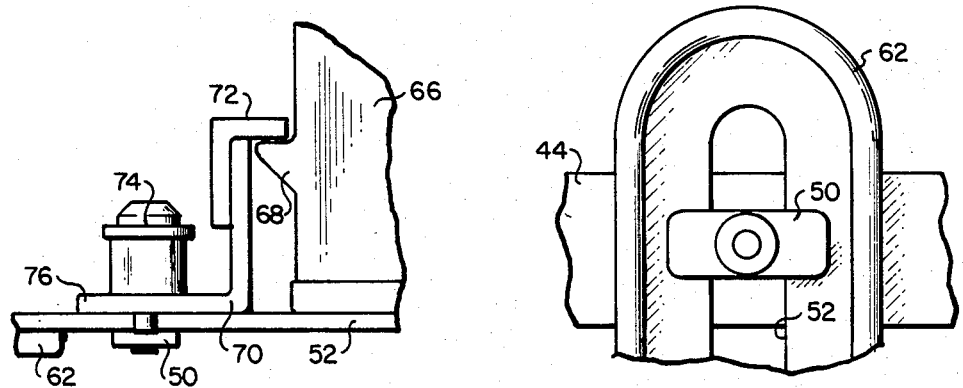
FIG. 5
FIG. 4

SECURITY BATTERY HOLDER

BACKGROUND OF THE INVENTION

The present invention relates to automobile accessories and pertains particularly to a theft resistant battery holder.

The typical automobile battery is a fairly expensive item and it is usually mounted in a battery holder readily accessible beneath the hood of the typical automobile. For this reason batteries are frequently the target of theft resulting in major inconvenience for many motorists as well as extensive annual financial losses.

Attempts have been made in the past to secure automobile batteries against theft. These however have proven rather ineffective for various reasons.

It is therefore desirable that a simple, effective and inexpensive means be available for providing theft resistance to automobile batteries.

SUMMARY AND OBJECTS OF THE INVENTION

It is the primary object of the present invention to provide an improved security holder for automobile batteries.

In accordance with the primary aspect of the present invention an automobile battery security holder includes a support pan having upwardly extending side rails defining a confining channel with a releasable, lockable, bolt cutter resistance strap secured to one end of the support pan for extending over and connecting to the other end of the pan at the other end of a battery for securing the battery in position.

BRIEF DESCRIPTION OF THE DRAWINGS

The above and other objects and advantages of the present invention will become apparent from the following description when read in conjunction with the drawings wherein:

FIG. 1 is a perspective view of a preferred embodiment of the invention;

FIG. 2 is a side elevation view of the embodiment of FIG. 1;

FIG. 3 is an end view of the embodiment of FIG. 1;

FIG. 4 is a view taken generally on line 4—4 of FIG. 3; and

FIG. 5 is a detailed view partially in section showing an alternate embodiment.

DETAILED DESCRIPTION OF THE DRAWINGS

Referring to FIG. 1 of the drawings, a battery holder in accordance with the invention is designated generally by the numeral 10 and includes a generally rectangular base or pan member 12 having a generally flat rectangular configuration with upturned side panels or members 14 and 16 thereby defining a generally longitudinal, laterally confining channel having a preferably fixed upturned rear end wall 18 within which to position or support a typical automobile battery 20. The pan 12 is constructed to accommodate different size batteries of a typical box-like configuration, with an adjustable length security strap similarly constructed to extend and accommodate different size batteries.

Referring to FIG. 2, the battery holder includes a security strap that has a pair of substantially identical vertical strap members with a generally fixed vertical strap member (fixed in position) that is connected to a fixed end plate or wall 18 and includes an upper strap member 22 connected by an adjustable link such as a turn buckle-like structure including a threaded bolt 24 and at least one nut 26. In the illustrated embodiment a second nut 28 is provided, however, the bolt 24 can be secured such as by welding directly to the fixed end plate or wall 18 providing for extension of the length of the strap by rotation of the strap member 22 relative to the bolt 24.

The strap member 22 includes a hook member 30 at the upper end thereof which turns over and hooks back down parallel to the strap 22 for engaging a slot 38 in an upper elongated strap member which consists of a pair of identical strap members 32, each of which includes at an end thereof includes a pair of fingers 34 and 36 extending and curling over the sides thereof to overlap the second like member 32. Each of the strap members includes a slot or opening 38 in the end thereof for receiving the hooks of the strap members 22.

Both the forward and rearward straps have an upper identical strap portion 22 having an upper hook 30 and a lower threaded bore 26 for receiving a bolt 24.

At the forward end of the pan 12 a releasable strap includes an extendable bolt 24 secured by a nut 40 to an adjustable position or moveable end plate or wall 42 that extends the full width of the pan 12 with an outwardly extending flange 44 in which is mounted a keyed lock member 46. The lock member includes a multiple pin tumbler and a key receiving member with a rotatable shaft 48 and cross arms 50 for extending across to each side of the slot 52 formed in the pan 12. A plurality of holes 54 and 56 extend along in lines parallel and to the side of the slot 52 for receiving pins 58 and 60 mounted in and extending down from the flange 44 of the adjustable position plate member 42. This enables the strap to be positioned to accommodate different length batteries.

The upper strap 32 includes a pair of identical members which are interconnected with the ends of each strap extending through the slot formed by the overlapping or curved around fingers 34 and 36 to provide an extensible link or strap member as illustrated. This together with the adjustable position locking strap member 42 enables a combination of batteries of various sizes. The vertically adjustable strap members 22 similarly accommodate batteries of different vertical heights.

A generally horseshoe shaped shield 62 curves around just outside the slot 52 and is positioned to permit the wings 50 of the lock to extend crossways as shown in FIG. 4. This shields the wings against a pry bar and like tools or implements and also provides space beneath the pan for accommodating the wings of the lock unit.

A simplified lock structure is illustrated in FIG. 5 for the types of batteries having a retaining lug or flange on both ends near the lower edge of the ends as shown in FIG. 5. As shown in FIG. 5, a battery 66 includes an outwardly projecting retaining flange or lug 68 which is engaged by special locking bracket 70 having an inwardly extending flange 72 for overlapping and engaging the retaining flange 68. A locking unit 74 is mounted in the outwardly extending flange member 76 of the retainer which is constructed substantially like that of the previous embodiment for similarly engaging the bores in the pan 12 and with the lock engaging the slot 52 for retaining the battery in a locked position. The fixed end wall 18 of the pan includes a lateral slot 78 as shown in FIG. 2 for receiving a battery flange 68 as shown in phantom in FIG. 2. Thus, batteries having the outwardly extending flanges at the ends can be secured in the holder with either the strap assembly or the locking bracket of FIG. 5.

The strap structure is constructed of a material that can be and is heat treated, case hardened or otherwise treated such that it is resistant to bolt cutters thereby preventing the use of bolt cutters for removing the batteries. At least the bolt portions 24 and the straps 22 and 32 of the embodiment as shown in FIG. 2 would be heat treated or case hardened to resist theft by means of bolt cutters preferably the end walls 18, 42 and 70 are also hardened.

The entire structure is preferably coated with corrosion resistant nonconductive epoxy coating to resist corrosion by battery acid or rust and to prevent shorting of the battery. The coating is preferably a powdered coating of epoxy that may be applied such by a fusion process for providing a highly corrosion resistant and nonconductive coating. One known process applies dry resin based powder (available under the FUZETRON trademark) electrically and then cures the coating at about 400° F.

In operation a battery holder in accordance with the invention is mounted and secured in place in an automobile such as by welding or suitable security bolting and the like. A battery is selected and placed in the holder and the strap system adjusted both vertically and lengthwise to accommodate the battery. The fixed end strap is first adjusted to the height of the battery to engage in the slots 38 of the straps 32 such that the hook 30 extends sufficiently down to prevent removal of the strap when it is in a horizontal position with the strap being adjusted in length to accommodate the forward movable strap 22 such that the forward strap is adjusted to the height of the battery and the forward strap assembly then locked in place by insertion of the lock unit such that the wings 50 extend through the slot 52 and rotate transverse to the slot for retaining the battery in position. Thereafter, to remove the battery a key is inserted in the lock 46 and rotated to align the wings 50 of the lock unit with the slot 52 to permit the wings to pass therethrough permitting the forward strap assembly to be removed and the remainder of the straps to be removed to release the battery.

The FIG. 5 embodiment operates in a similar fashion with the slot 78 of the fixed end wall 18 receiving one battery retaining flange 68 (FIG. 5) and retaining member 70,72 simply overlapping and engaging the other retaining flange on a battery of that style. Similarly, the aft retaining wall 18 includes portions above the slot overlapping and engaging the battery flange. The wall 70 could also be provided with a slot instead of a flange as shown.

While I have illustrated and described my invention by means of specific embodiments it is to be understood that numerous changes and modifications may be made therein without departing from the spirit and scope of the invention as defined in the appended claims.

I claim:

1. An automobile battery security holder comprising:
   a generally rectangular planar support member having vertically extending side members extending along the lateral edges thereof for supporting and laterally confining a battery; and
   an adjustable length security strap connected at one end to one end of said support member and releasably connected at the other end by keyed lock means to said support member for extending over the top of a battery for securing same to said support member, said security strap being constructed of a hardened metal for resisting the action of bolt cutters.

2. The battery holder of claim 1 wherein said strap includes a pair of adjustable length vertical straps for extending upward from each end of a battery or said support member; and
   an adjustable length horizontal top strap member for connecting between the upper ends of said vertical strap across the top of said battery.

3. The battery holder of claim 2 wherein said support member includes multiple connecting means for said keyed lock end of said strap for accommodating variable length batteries.

4. The battery holder of claim 3 wherein said one end of said strap is fixed and the other end is movable.

5. The battery holder of claim 1 wherein said support member includes a fixed end wall at one end and a moveable end wall at the other end, and said strap being connected between said end walls.

6. The battery holder of claim 5 wherein said strap comprises a pair of identical vertical end straps and an extensible length horizontal strap releasably connected between said end straps.

7. The battery holder of claim 6 wherein said end straps include a hook at the upper end thereof, and said horizontal strap includes slots in the ends thereof for receiving said hooks.

8. The battery holder of claim 7 wherein said moveable end wall is detachably secured to said support member by said keyed lock means.

9. The battery holder of claim 8 wherein said horizontal strap is constrtucted of a pair of identical interlocking strap members that are slideable relative to one another for adjusting the length thereof.

10. The battery holder of claim 9 wherein said end straps include threaded shanks threadably engaging said end walls for adjusting the relative length of the respective end strap.

11. The battery holder of claim 1 wherein said entire holder is coated with a corrosion resistant non-conductive epoxy.

* * * * *